United States Patent
Aoki

(10) Patent No.: US 11,099,792 B2
(45) Date of Patent: Aug. 24, 2021

(54) INFORMATION PROCESSING SYSTEM, IMAGE PROCESSING APPARATUS, NON-TRANSITORY COMPUTER READABLE MEDIUM FOR SORTING BILLING INFORMATION INTO BILLING DESTINATIONS

(71) Applicant: FUJIFILM BUSINESS INNOVATION CORP., Tokyo (JP)

(72) Inventor: Masanori Aoki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/538,885

(22) Filed: Aug. 13, 2019

(65) Prior Publication Data
US 2020/0278816 A1 Sep. 3, 2020

(30) Foreign Application Priority Data
Mar. 1, 2019 (JP) .............................. JP2019-037723

(51) Int. Cl.
*G06F 3/12* (2006.01)
*H04N 1/34* (2006.01)

(52) U.S. Cl.
CPC .......... *G06F 3/1204* (2013.01); *G06F 3/1243* (2013.01); *G06F 3/1273* (2013.01); *H04N 1/34* (2013.01)

(58) Field of Classification Search
CPC ............ H04N 1/34–348; G06F 3/1204; G06F 3/1243; G06F 3/1273
See application file for complete search history.

(56) References Cited

U.S. PATENT DOCUMENTS

| | | | |
|---|---|---|---|
| 6,874,034 B1* | 3/2005 | Hertling | G06F 3/1204 709/201 |
| 2001/0000027 A1* | 3/2001 | Collard | H04N 1/00482 399/398 |
| 2001/0038462 A1* | 11/2001 | Teeuwen | H04N 1/32545 358/1.15 |
| 2001/0056406 A1* | 12/2001 | Nagoya | G06Q 30/06 705/52 |
| 2002/0027673 A1* | 3/2002 | Roosen | H04N 1/00405 358/1.13 |

(Continued)

FOREIGN PATENT DOCUMENTS

| | | |
|---|---|---|
| JP | 2001-338260 A | 12/2001 |
| JP | 2007-41699 A | 2/2007 |

*Primary Examiner* — Nicholas Pachol
(74) *Attorney, Agent, or Firm* — Oliff PLC

(57) ABSTRACT

An information processing system includes an image processing apparatus and an information processing apparatus. The image processing apparatus includes a printing unit that prints a document selected by a user and a transmitting unit that transmits, to the information processing apparatus, identification information on a storage location having stored the document and billing information on billing related to printing the document. The information processing apparatus includes a receiving unit that receiving from the image processing apparatus the identification information and the billing information and a bill processing unit that performs by using the billing information a billing process on each billing destination corresponding to the identification information.

7 Claims, 15 Drawing Sheets

(56) References Cited

U.S. PATENT DOCUMENTS

| | | | |
|---|---|---|---|
| 2004/0126167 A1* | 7/2004 | Roosen | G06F 3/1291 400/76 |
| 2005/0195431 A1* | 9/2005 | Van Den Tillaart | B41J 29/38 358/1.15 |
| 2005/0213115 A1* | 9/2005 | Johnson | G06F 3/1239 358/1.1 |
| 2006/0023252 A1* | 2/2006 | Kanai | G06F 3/1285 358/1.15 |
| 2006/0274367 A1* | 12/2006 | Yamamoto | G06F 3/1204 358/1.15 |
| 2006/0277229 A1* | 12/2006 | Yoshida | G06F 16/93 |
| 2007/0185885 A1* | 8/2007 | Tamura | G06F 16/93 |
| 2009/0207447 A1* | 8/2009 | Keane | G06F 3/1285 358/1.15 |
| 2010/0290081 A1* | 11/2010 | Uchida | G06F 3/1207 358/1.15 |
| 2010/0293602 A1* | 11/2010 | Uchida | G06F 21/608 726/4 |
| 2011/0170131 A1* | 7/2011 | Kondo | H04N 1/34 358/1.14 |
| 2016/0231970 A1* | 8/2016 | Tabuki | G06F 3/1232 |
| 2017/0289394 A1* | 10/2017 | Kitai | H04N 1/00925 |
| 2018/0011666 A1* | 1/2018 | Yoshida | G06F 3/1204 |
| 2019/0250864 A1* | 8/2019 | Sugai | G06F 3/1287 |
| 2020/0117637 A1* | 4/2020 | Roy | G06F 16/137 |

* cited by examiner

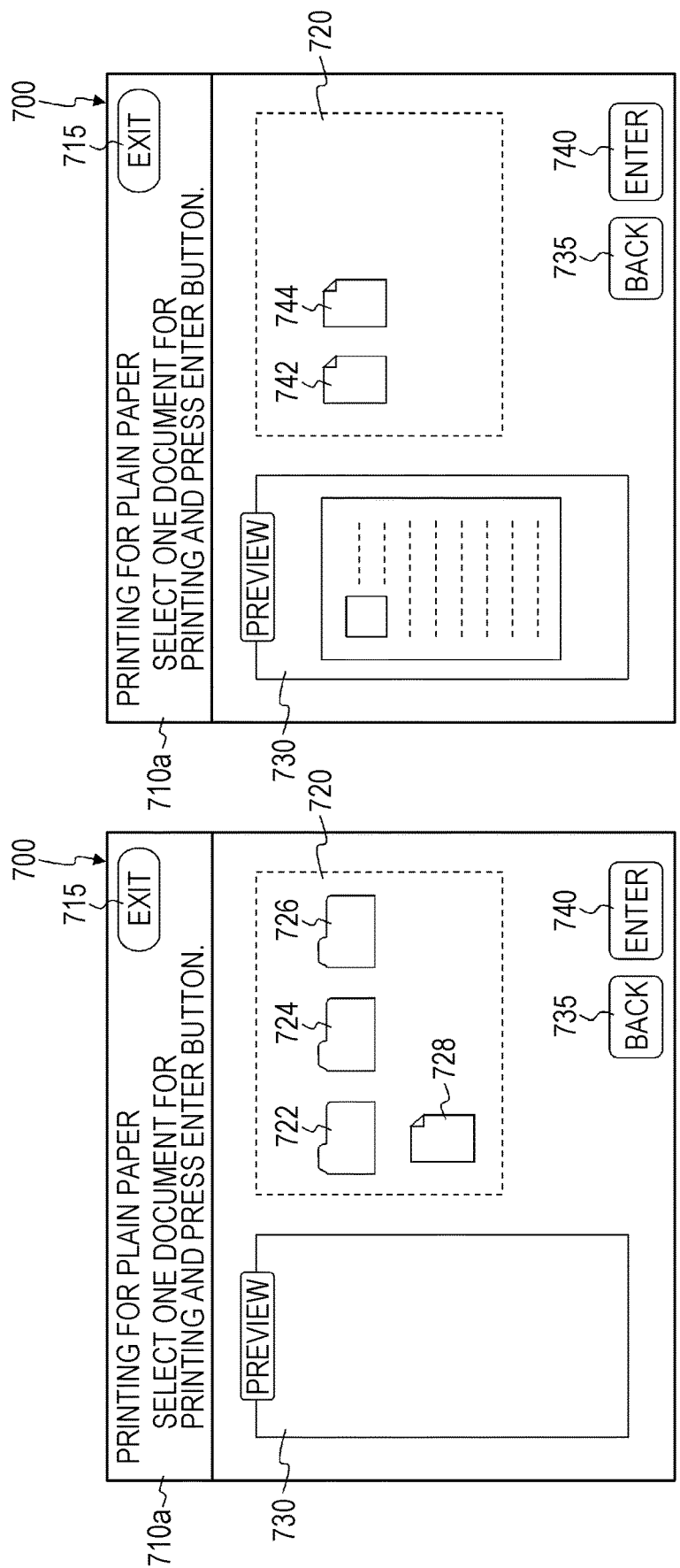

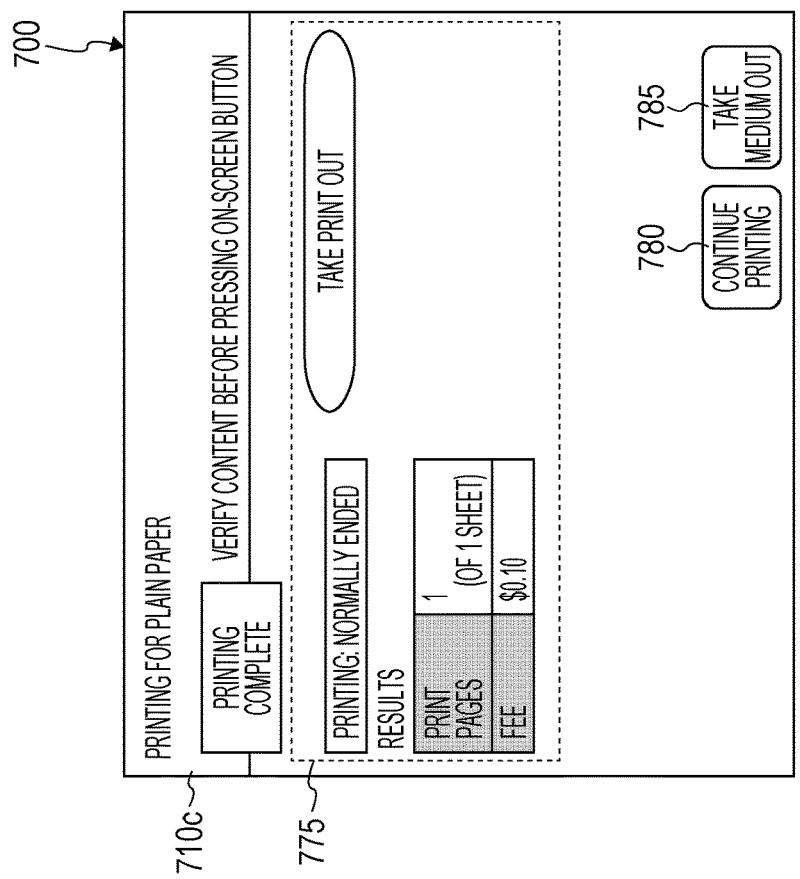
FIG. 7B1
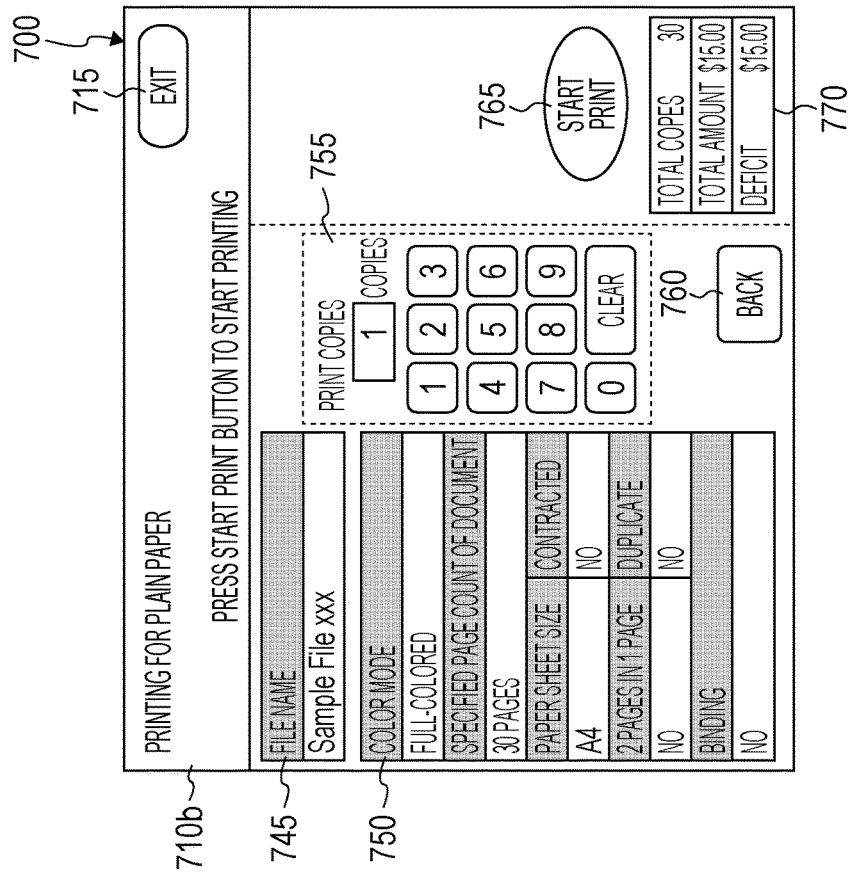
FIG. 7B2

FIG. 8

| FOLDER ID | RECEIPT DATA ||||||||
|---|---|---|---|---|---|---|---|---|
| | PRINT DATE AND TIME | IMAGE PROCESSING APPARATUS ID | DOCUMENT NAME | PAGE COUNT | FEE PER UNIT | PRINT COPIES | FEE | USE DETAIL |
| XXXXXXXX | 2018/12/01 12:34:56 | MFP0000001 | AB PROPOSAL | 5 PAGES | $0.10 | 5 COPIES | $2.50 | DISCHARGED |
| YYYYYYYY | 2018/12/05 12:34:56 | MFP0000100 | AB APPROXIMATE QUOTATION | 1 PAGE | $0.50 | 2 COPIES | $1.00 | |
| ZZZZZZZZ | 2018/12/10 12:34:56 | MFP0000100 | CD RESEARCH PROGRAM | 10 PAGES | $0.10 | 1 COPY | $1.00 | |
| XXXXXXXX | 2018/12/20 12:34:56 | MFP0000020 | AB PAMPHLET | 2 PAGES | $0.50 | 30 COPIES | $30.00 | |
| ZZZZZZZZ | 2018/12/25 12:34:56 | MFP0000001 | CD RESEARCH RESULTS | 25 PAGES | $0.10 | 1 COPY | $2.50 | |
| ... | | | | | | | | |

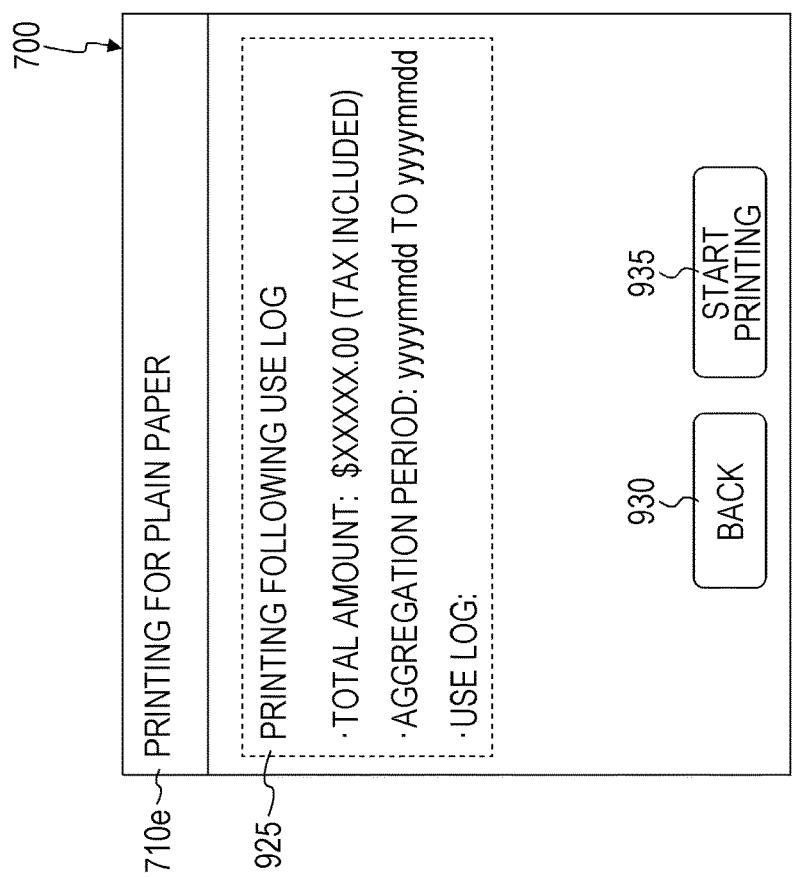
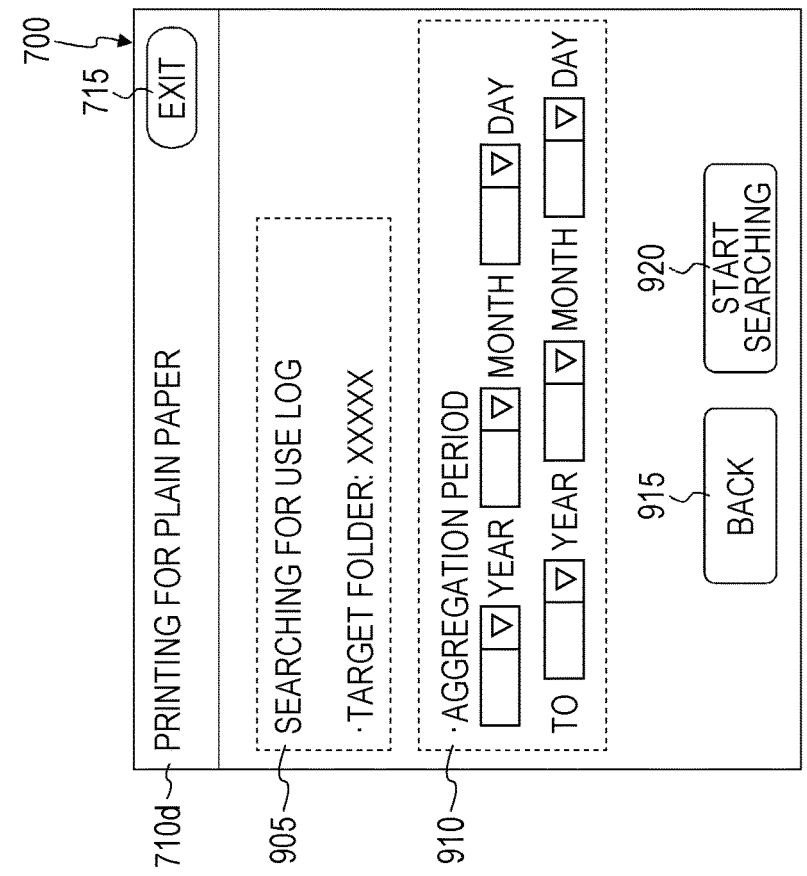

| FOLDER NAME | STORED DOCUMENT |
|---|---|
| AB COMPANY | AB PAMPHLET.pdf |
| | AB PROPOSAL.pdf |
| | PrintChargeData.pcd<br>*FOLDER ID: XXXXXXXXXX |
| QUOTATION | (NONE) |
| APPROXIMATE QUOTATION | AB APPROXIMATE QUOTATION.pdf |
| | PrintChargeData.pcd<br>*FOLDER ID: YYYYYYYYYY |
| OFFICIAL QUOTATION | AB OFFICIAL QUOTATION.pdf |

TOTAL AMOUNT RECEIVED: $33.50 (TAX INCLUDED)
*AGGREGATION TARGET: RECEIPT DATA SATISFYING FOLLOWING AND GATE CONDITION IS AGGREGATED.
 (1) FOLDER IDENTIFICATION DATA UNDER ROOT FOLDER
 (2) USE DETAIL IS NOT YET OUTPUT

USE LOG: USE LOG IS LISTED AS BELOW.

| PRINT DATE AND TIME | DOCUMENT NAME | PAGE COUNT | FEE PER UNIT | PRINT COPIES | FEE |
|---|---|---|---|---|---|
| 2018/12/05 12:34:56 | AB APPROXIMATE QUOTATION | 1 PAGE | $0.50 | 2 COPIES | $1.00 |
| 2018/12/20 12:34:56 | AB PAMPHLET | 2 PAGES | $0.50 | 30 COPIES | $30.00 |

INFORMATION PROCESSING SYSTEM, IMAGE PROCESSING APPARATUS, NON-TRANSITORY COMPUTER READABLE MEDIUM FOR SORTING BILLING INFORMATION INTO BILLING DESTINATIONS

CROSS-REFERENCE TO RELATED APPLICATIONS

This application is based on and claims priority under 35 USC 119 from Japanese Patent Application No. 2019-037723 filed Mar. 1, 2019.

BACKGROUND

(i) Technical Field

The present disclosure relates to an information processing system, an image processing apparatus, and a non-transitory computer readable medium.

(ii) Related Art

Japanese Unexamined Patent Application Publication No. 2007-041699 discloses a printing service system. In the printing service system, a user brings a digital document to a store that provides printing service to print the digital document and uses the printing service there without using a cash. A fee for the printing service is paid in advance and encrypted authentication information proving the paid status is written on a small-scale storage medium. The user then stores the digital document to be printed on the small-scale storage medium, brings the small-scale storage medium to the print service store for printing, and then requests the store to print the digital document. The user thus enjoys the print service without paying the fee each time. The authentication information may include print restriction information (such as a maximum print copies permitted per day or at a time or a restriction on color print) or restriction on use. This may possibly lead to low-cost print service. When the user has received the print service, the digital document serving as a print service target and the authentication information on the digital document are stored on the small-scale storage medium such that the next service is received.

Japanese Unexamined Patent Application Publication No. 2001-338260 discloses a technique related to managing billing amount information. The billing amount information is managed such that an item of detailed billing and an aggregation method of the detailed billing are modified in view of the purpose of utilization. Billing amount items in the billing amount information are sorted in a layer structure and defined by a sorting table storage unit. The billing information of the fee for the billing amount item corresponding to a lowest-ranking layer of the layer structure is aggregated and stored by a billing information storage unit. When a detailed billing generation unit generates the billing amount information, the billing amount items spreading from a higher-ranking layer to a predetermined position specified by an output level specifying unit in the layer structure are output into the billing amount information.

When a user prints a document, the user may expressly specify a billing destination to sort information related to print fees according to the billing destination.

SUMMARY

Aspects of non-limiting embodiments of the present disclosure relate to providing an information processing system that sorts billing information into billing destinations without the user expressly specifying the billing destinations.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system. The information processing system includes an image processing apparatus and an information processing apparatus. The image processing apparatus includes a printing unit that prints a document selected by a user and a transmitting unit that transmits, to the information processing apparatus, identification information on a storage location having stored the document and billing information on billing related to printing the document. The information processing apparatus includes a receiving unit that receiving from the image processing apparatus the identification information and the billing information and a bill processing unit that performs by using the billing information a billing process on each billing destination corresponding to the identification information.

BRIEF DESCRIPTION OF THE DRAWINGS

Exemplary embodiment of the present disclosure will be described in detail based on the following figures, wherein:

FIGS. 7A1 and 7A2 illustrate process examples of the exemplary embodiment;

FIGS. 7B1 and 7B2 illustrate process examples of the exemplary embodiment;

FIG. 8 illustrates a data structure of a bill management table;

FIGS. 9B1 and 9B2 illustrate process examples of the exemplary embodiment;

FIG. 12 illustrates a process example of the exemplary embodiment;

DETAILED DESCRIPTION

Exemplary embodiment of the disclosure is described with reference to the drawings.

Figure 1:
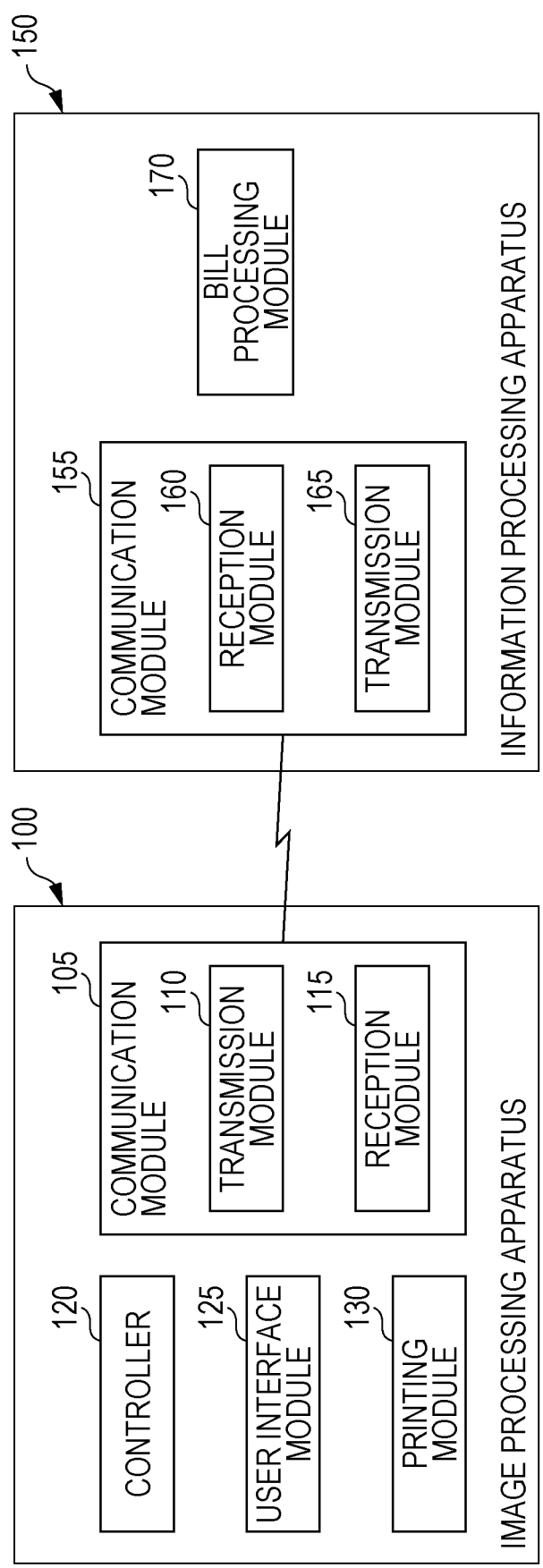
FIG. 1 illustrates a conceptual modular configuration of an information processing system of the exemplary embodiment.

FIG. 1 illustrates a conceptual modular configuration of an information processing system of the exemplary embodiment.

The term "module" refers to a software component (including a computer program) that is logically separable, or a hardware component. The module of the exemplary embodiment refers to not only a module in a computer program but also a module in a hardware configuration. The discussion of the exemplary embodiment also serves as the discussion of computer programs for causing the modules to function (including a program that causes a computer to execute each step, a program that causes the computer to function as an element, and a program that causes the computer to implement each function), a system and a method. In the discussion that follows, the phrases "stores information," "causes information to be stored," and other phrases equivalent thereto are used. If the exemplary embodiment is a computer program, these phrases means that control is performed to cause a memory to store data or to store data on the memory. The modules may correspond to the functions in a one-to-one correspondence. In software implementation, one module may be composed of one program or multiple modules may include one program. One module may include multiple programs. Multiple modules may be executed by a single computer. Conversely, a single module includes multiple programs. Multiple modules may be implemented by a single computer or may be implemented by multiple computers in a distributed environment or a parallel environment. One module may include another module. In the discussion that follows, the term "connection" refers to not only a physical connection but also a logical connection (such as an exchange of data, instructions, data reference relationship, or login). The term "predetermined" means that something is decided in advance of a process of interest. The term predetermined is thus intended to refer to something that is decided in advance of a process of interest in the exemplary embodiment. Even after a process in the exemplary embodiment has started, the term predetermined refers to something that is decided in advance of a process of interest depending on a condition or a status of the exemplary embodiment at the present point of time or depending on a condition or status of the exemplary embodiment heretofore continuing down to the present point of time. If plural predetermined values are used, the predetermined values may be different from each other, or two or more of the predetermined values (including all the values) may be equal to each other. A statement that "if A, B is to be performed" is intended to mean that it is determined whether something is A, and that if something is determined as A, an action B is to be taken. The statement is not applied if the determination as to whether something is A is not performed. If events "A, B, and C" are quoted and described, the discussion is applicable to all the events A, B, and C as well as any one selected from the events (for example, only the event A) unless otherwise noted. The description of the events A, B, and C is applicable to at least one of the events A, B, and C.

The term "system" and the term "apparatus" refer to an arrangement where multiple computers, a hardware configuration, and an apparatus are interconnected via a communication network (including a one-to-one communication connection). The term system and the term apparatus also refer to an arrangement that includes a single computer, a hardware configuration, and an apparatus. The term system and the term apparatus have the same definition and are interchangeable with each other. The system in the context of the exemplary embodiment does not include a social system that is a social arrangement formulated by humans.

At each process performed by a module, or at one of the processes performed by a module, information as a process target is read from a memory device, the information is then processed, and the process result is written onto the memory device. A description related to the reading of the information from the memory device prior to the process and the writing of the processed information onto the memory device subsequent to the process may be omitted as appropriate. The memory devices may include a hard disk, a random-access memory (RAM), an external storage medium, a memory device connected via a communication network, and a register within a central processing unit (CPU).

An image processing apparatus 100 and information processing apparatus 150 of the exemplary embodiment have a billing function that is performed when the image processing apparatus 100 prints a document. The image processing apparatus 100 and information processing apparatus 150 are connected to each other via a communication network.

The image processing apparatus 100 includes a communication module 105, controller 120, user interface module 125, and printing module 130. The image processing apparatus 100 may be a printer or a multi-function apparatus having at least a printing function. For example, the multi-function apparatus may be an image processing apparatus that has at least two or more functions of scanner function, copying function, and facsimile function. The document includes a file or digital file.

The communication module 105 includes a transmission module 110 and reception module 115 and is connected to a communication module 155 in the information processing apparatus 150. The communication module 105 communicates with the information processing apparatus 150.

The transmission module 110 transmits information to the information processing apparatus 150. For example, the transmission module 110 transmits to the information processing apparatus 150 identification information on a storage location having stored a document and printing information on billing related to printing. The identification information uniquely identifies the storage location of the document. For example, the identification information corresponds to a folder name, layer of a directory, sequential number according to which the storage locations are generated, uniform resource locator (URL), and/or hash value of the folder name or the URL.

The storage location indicates where a document is stored on a memory. For example, the storage location corresponds to a folder or directory. The memory simply stores a document and may be a portable storage device, such as a universal serial bus (USB) memory, from which the image processing apparatus 100 may read data. The memory may be a document server that communicates with the image processing apparatus 100.

The billing information includes at least information on an amount that has been paid for the service of printing. The billing information may include attribute information as well as the information on the paid amount. Log information includes specific information identifying date and time of printing, user, and image processing apparatus, information related to the number of documents printed and the size of the paper sheets used in the printing, information indicating whether the printing is color printing or monochrome printing, and information on a fee per sheet for the printing. In accordance with the exemplary embodiment, the specific information of the image processing apparatus uniquely identifies the image processing apparatus. The specific information corresponds to a serial number assigned to each image processing apparatus or information indicating the mounting location of the image processing apparatus (for example, a combination of latitude, longitude, and height).

When the billing information is printed, the transmission module 110 may transmit the identification information stored on a storage location to the information processing apparatus 150.

The reception module 115 receives information from the information processing apparatus 150. For example, the reception module 115 receives the billing information on which the information processing apparatus 150 has performed a billing operation.

The controller 120 controls the whole image processing apparatus 100. The controller 120 performs control to store the identification information on the storage location to set the identification information to be undeletable or unmodifiable. "Control to set the identification information to be undeletable or unmodifiable" corresponds to setting access information of a file having the identification information to be undeletable or uneditable.

The controller 120 may perform control to set the identification information to be deletable or modifiable on condition that the operation performed on the image processing apparatus 100 is the operation performed by a user. Only a person who directly operates the image processing apparatus 100 has the right to delete or modify the identification information on a memory. If the memory is accessed by an apparatus, such as a personal computer, other than the image processing apparatus 100, the identification information is not deletable or modifiable.

The controller 120 may also store on a storage location A the identification information that is intended to be stored on a storage location B related to the storage location A (storage location B is an example of a second storage location). The identification information is thus redundantly stored on multiple storage locations. Even if the identification information on the storage location B happens to be deleted, the identification information is reproduced by using the identification information on the storage location A. If control is made to set the identification information is to be deletable or modifiable, the controller 120 may store on the storage location A the identification information that is intended to be stored on the storage location B related to the storage location A. If control is not made to set the identification information to be deletable or modifiable, the controller 120 does not store on the storage location A the identification information intended to be stored on the storage location B.

The "second storage location" related to the storage location may be a storage location that is at a layer hierarchically above the first storage location, a storage location that is at a layer hierarchically below the first storage location, or a storage location that is at the same layer as the first storage location. The hierarchical relationship is represented by a tree structure.

The user interface module 125 serves as an interface with the user. For example, by controlling a liquid-crystal display serving also a touch panel, the user interface module 125 receives an operation of the user and displays a message and the like to the user. The user interface module 125 may receive the operations of the user who may use a mouse, keyboard, camera, and/or microphone. The operations of the user include the visual line, gesture, and/or voice of the user. The message to the user may also be provided via an audio output from a speaker or tactile feeling on a tactile device.

The printing module 130 prints a document selected by the user. The selection by the user is the operation received by the user interface module 125. For example, the user selects a document serving as a printing target from documents stored on the storage location displayed by the user interface module 125. The selection by the user may include selecting a document from multiple documents stored on the storage location or selecting a single document even if only the single document is stored on the storage location.

The printing module 130 may print the billing information received from the information processing apparatus 150. If the billing information related to the second storage location has not been printed when the billing information is printed, the controller 120 may present to the user an indication that the billing information related to the second storage location has not been printed.

The presentation of the indication may include an operation of displaying a message on a display of the image processing apparatus 100, an operation of outputting an audio from a speaker of the image processing apparatus 100, an operation of drawing the user's attention by using tactile feeling with a tactile device, or an operation of using a combination of these operations.

A determination as to whether the billing information related to the second storage location has been unprinted is performed in the following ways. (1) The deletion of the identification information of the storage location of the billing information serving as a print target is triggered by the printing of the billing information. In such a case, the presence of the identification information on the second storage location means that the billing information related to the second storage location has been unprinted. Whether the billing information has been printed or not may thus be determined by referring to the presence or absence of the corresponding print data. (2) The storage location and the indication that the billing information has been printed are stored as a log in an associated form. The log is used to determine whether the billing information related to the second storage location has been printed. In other words, attribute information different from the print data is associated with the storage location and the determination is made by using the attribute information.

If the user who has noticed the indication wishes to print the billing information related to the second storage location, the user may simply use the identification information of the second storage location at the storage location.

If the second storage location has been deleted when the billing information is printed or if the identification information of the second storage location has been deleted or modified when the billing information is printed, the controller 120 may set the billing information related to the second storage location to be printable by using the identification information of the second storage location at the storage location.

The method of setting the billing information related to the second storage location to be printable is identical to a method of printing the billing information related to the storage location. Namely, the identification information of the second storage location stored on the storage location is transmitted to the information processing apparatus 150 and the billing information that has undergone a billing process of the information processing apparatus 150 is then received.

The information processing apparatus 150 includes a communication module 155 and bill processing module 170. The information processing apparatus 150 performs the billing process for the printing performed by the image processing apparatus 100.

The communication module 155 includes a reception module 160 and transmission module 165 and is connected to the communication module 105 in the image processing apparatus 100. The communication module 155 communicates with the image processing apparatus 100.

The reception module 160 receives the identification information and billing information from the image processing apparatus 100. The reception module 160 transfers the received identification information and billing information to the bill processing module 170.

The transmission module 165 transmits to the image processing apparatus 100 the billing information that the bill processing module 170 has performed the billing process.

The bill processing module 170 performs the billing process by using the billing information corresponding to the identification information on each billing destination responsive to the identification information received by the reception module 160.

The billing process is a process that is performed by using the billing information. The billing process may include aggregating the billing information on a per billing destination basis and transmitting, to the billing destination, information generated by using the billing information. Content of the information to be transmitted may include an amount of billed fees and a use log. The transmission may be performed by using an email or an message on social networking service (SNS) or by mailing a report having report content printed on it.

The billing destination is a person who is going to pay a fee caused by printing a document. The billing destination may be an entity or an individual person. If the billing destination is an individual person, the user is a typical case of the individual person. If another person requests the user to print, another person is the billing destination. A typical example of an entity as the billing destination is a company to which the user belongs to.

Figure 2:
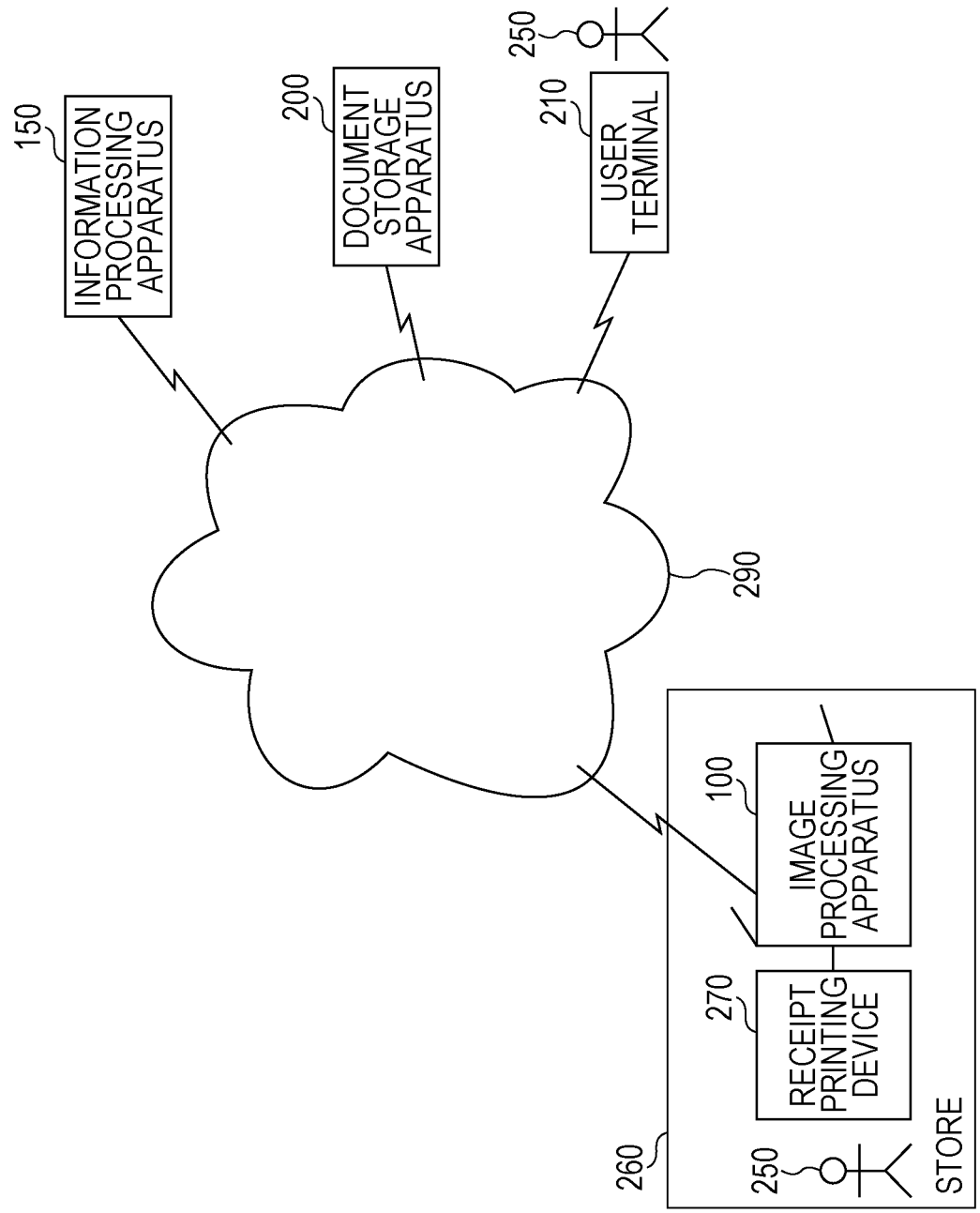
FIG. 2 illustrates a system configuration of the information processing system of the exemplary embodiment.

FIG. 2 illustrates a system configuration of the exemplary embodiment. The image processing apparatus 100 is installed in a store 260. The image processing apparatus 100 connects to a receipt printer 270. The image processing apparatus 100 in the store 260, information processing apparatus 150, document storage apparatus 200, and user terminal 210 are connected to each other via a communication network 290. The communication network 290 may be a wired network, a wireless network, or a combination thereof. The communication network 290 may be the Internet or intranet as a communication infrastructure. The functions of the information processing apparatus 150 and the document storage apparatus 200 may be implemented by using cloud service.

The user 250 creates a document by using the user terminal 210 and stores the created document onto a USB memory. The user 250 enters the store 260, connects the USB memory to the image processing apparatus 100, and then prints the document.

In accordance with the first exemplary embodiment, the following process is performed. The following description is intended to help improve understanding of the exemplary embodiment but not intended to limit the scope of the disclosure.

The user may have multiple jobs or a side job. For example, to print a document, the user having a side job may possibly use print service in a convenience store outside a company to which the user belongs. Referring to FIG. 2, the user 250 may print a document by using the image processing apparatus 100 in the store 260. This is part of the regular job. According to whether the expenses are for the regular job or the side job, the expenses for the print service are sorted and then settled.

The print services are sorted according to which of the regular job and the side job the user is in. The user individually manages billing destinations and receipts in the expense settlement. This process is not principal work of the user but takes time.

The user having a side job may typically sort business documents according to the use purpose of the image processing apparatus 100 and the user's own position as to whether the user is on the regular job or the side job. The user may create a folder on a per billing destination basis and print a document in the folder. The user may then charge the fee to the billing destination corresponding to the folder.

In accordance with the first exemplary embodiment, the identification information uniquely identifying the folder including the printed document and the billing information related to the billing are managed. The billing information is aggregated on each billing destination corresponding to the identification information. The use log for each folder on the used memory may be verified.

Figure 3:
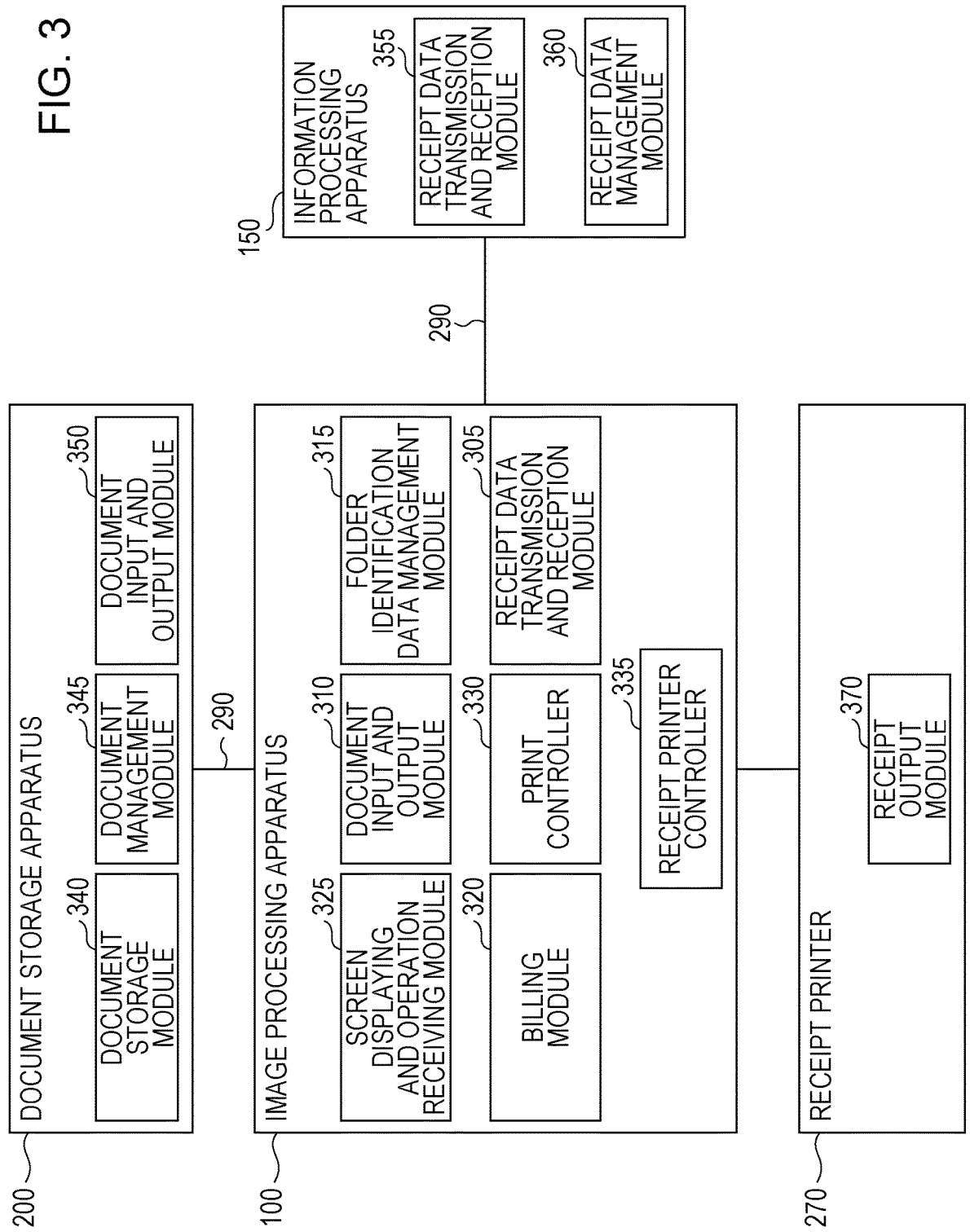
FIG. 3 illustrates a specific modular configuration of the information processing system of the exemplary embodiment.

FIG. 3 illustrates a specific modular configuration of the exemplary embodiment. The image processing apparatus 100 includes a receipt data transmission and reception module 305, document input and output module 310, folder identification data management module 315, billing module 320, screen displaying and operation receiving module 325, print controller 330, and receipt printer controller 335. The image processing apparatus 100 is connected to a receipt printer 270. The image processing apparatus 100 is also connected to the information processing apparatus 150 and the document storage apparatus 200 via the communication network 290.

The receipt data transmission and reception module 305 corresponds to the communication module 105 and transmits the billing information and the identification information of the folder to the information processing apparatus 150. The billing information includes print information related to print settings and a document name and use information related to the amount paid for the print service, date and time on which the print service has been performed, and store at which the print service has been provided.

The document input and output module 310 inputs a document to and outputs a document from the document storage apparatus 200. The document input and output operation may include searching, acquisition, creation, deletion, and modification of the document.

The folder identification data management module 315 manages the identification information of the folder. The management operation may include creation and deletion of the identification information. The billing module 320 charges the fees for the print operation.

The screen displaying and operation receiving module 325 corresponds to the user interface module 125. By controlling a touch panel or the like, the screen displaying and operation receiving module 325 generates and displays a screen that is operated by the user and receives an operation performed on the screen. The print controller 330 corresponds to the printing module 130 and print a document.

The receipt printer controller 335 corresponds to the printing module 130 and instructs the receipt printer 270 to print the billing information related to the amount paid and data and time of the print operation.

The document storage apparatus 200 includes a document storage module 340, document management module 345, and document input and output module 350. The document storage apparatus 200 is connected to the image processing apparatus 100 via the communication network 290. The document storage apparatus 200 simply sends a document to the image processing apparatus 100. For example, the document storage apparatus 200 may be a cloud server as illustrated in FIG. 2, a USB memory, or a portable communication device, such as a smart phone.

The document storage module 340 stores in a folder created on a per billing destination basis a document serving as a print target.

The document management module 345 performs information management and control management on a document. The control management on the document includes creation, modification, and deletion of the document.

The document input and output module 350 inputs or outputs a document in response to a request from the image processing apparatus 100.

The information processing apparatus 150 includes a receipt data transmission and reception module 355 and receipt data management module 360 and is connected to the image processing apparatus 100 via the communication network 290. The information processing apparatus 150 has a function of a receipt management server.

The receipt data transmission and reception module 355 corresponds to the communication module 155 and receives from the image processing apparatus 100 the billing information and the identification information of the folder. In response to a request from the image processing apparatus 100, the receipt data transmission and reception module 355 transmits a use detail to the image processing apparatus 100. The use detail includes aggregation results of the billing information and a use log list listing use logs.

The receipt data management module 360 stores the billing information the identification information of the folder in an associated form. The receipt data management module 360 extracts the aggregation of the billing information and the use log in response to a request from the image processing apparatus 100.

The receipt printer 270 includes a receipt output module 370 and is connected to the image processing apparatus 100.

The receipt output module 370 prints a receipt in response to a print instruction from the image processing apparatus 100.

Figure 4:
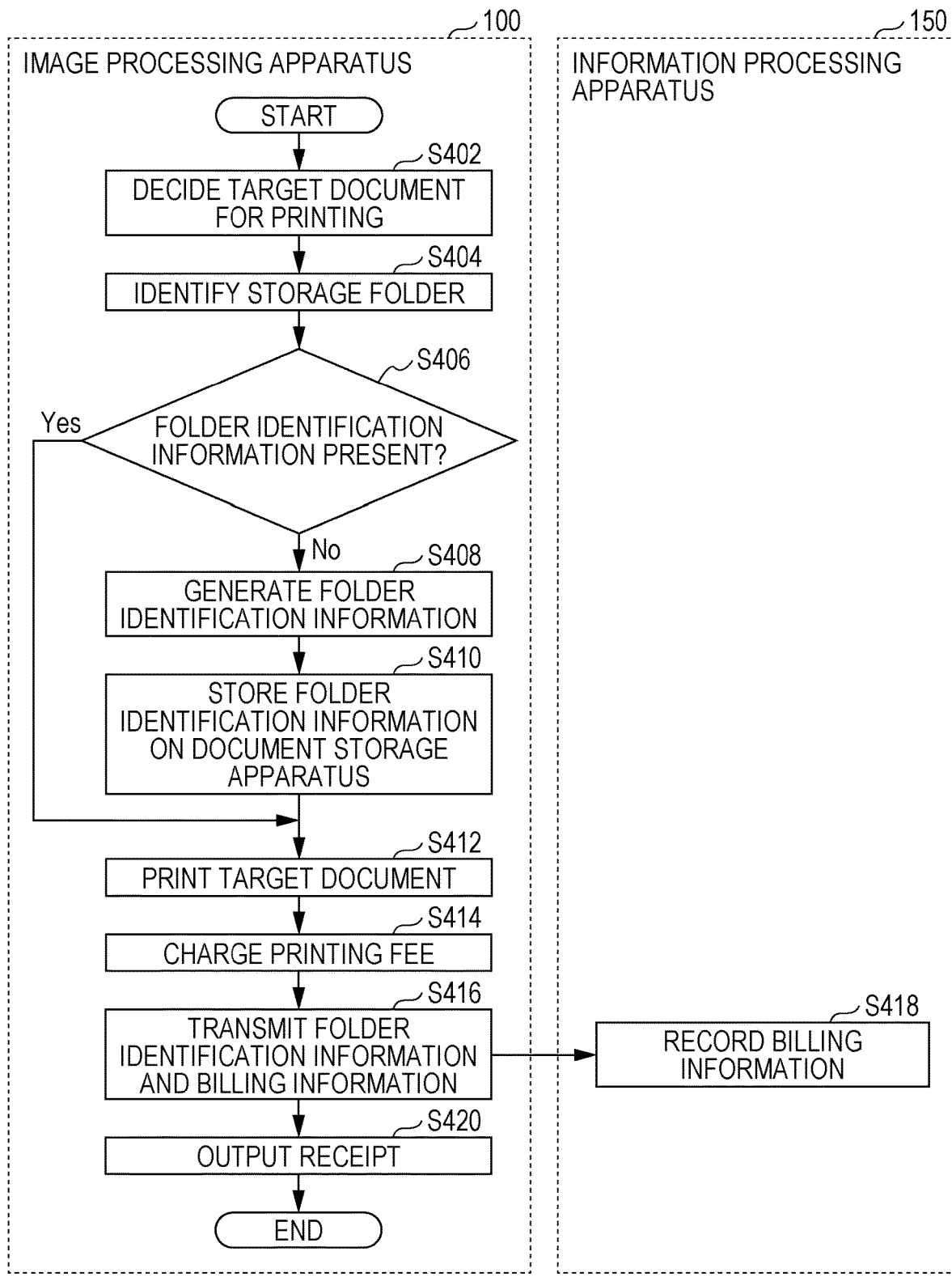
FIG. 4 is a flowchart illustrating a process of the exemplary embodiment.

FIG. 4 is a flowchart illustrating a process of the exemplary embodiment. The process is executed by the image processing apparatus 100 and the information processing apparatus 150.

The user 250 stores in advance a document serving as a print target in a folder for each billing destination in the document storage apparatus 200.

When a document as a print target is identified, the image processing apparatus 100 writes the identification information of the folder in the folder having the document in the document storage apparatus 200. When the print operation is complete, the image processing apparatus 100 transmits the identification information of the folder and the billing information to the information processing apparatus 150.

In step S402, in response to an operation of the user 250, the image processing apparatus 100 decides the document that is a print target.

In step S404, the image processing apparatus 100 identifies the folder storing the document.

In step S406, the image processing apparatus 100 determines whether the identification information of the folder is present or not. If the identification information of the folder is not present, processing proceeds to step S408 or otherwise proceeds to step S412.

In step S408, the image processing apparatus 100 provides the identification information of the folder. Specifically, the image processing apparatus 100 generates the identification information of the folder in accordance with the identification information of the image processing apparatus 100, folder name, and date and time of use. The identification information of the folder including information on an identifier of the folder is thus generated.

In step S410, the image processing apparatus 100 stores the identification information of the folder on the document storage apparatus 200. Only the user 250 having provided an instruction to print on the image processing apparatus 100 has the right to read or write the identification information of the folder. Specifically, only the user 250 who has executed the print service operation on the image processing apparatus 100 has the right to read or write the identification information of the folder.

In step S412, the image processing apparatus 100 prints the document as a print target.

In step S414, the image processing apparatus 100 charges the fee for the print operation. Specifically, the image processing apparatus 100 generates the billing information. The billing information includes information related to the amount collected from the user 250, date and time, and document name, and print information.

In step S416, the image processing apparatus 100 transmits the billing information and the identification information of the folder to the information processing apparatus 150.

In step S418, the information processing apparatus 150 stores the identification information of the folder and the billing information in an associated form.

In step S420, the image processing apparatus 100 outputs a receipt for the fee for the print operation.

Figure 5:
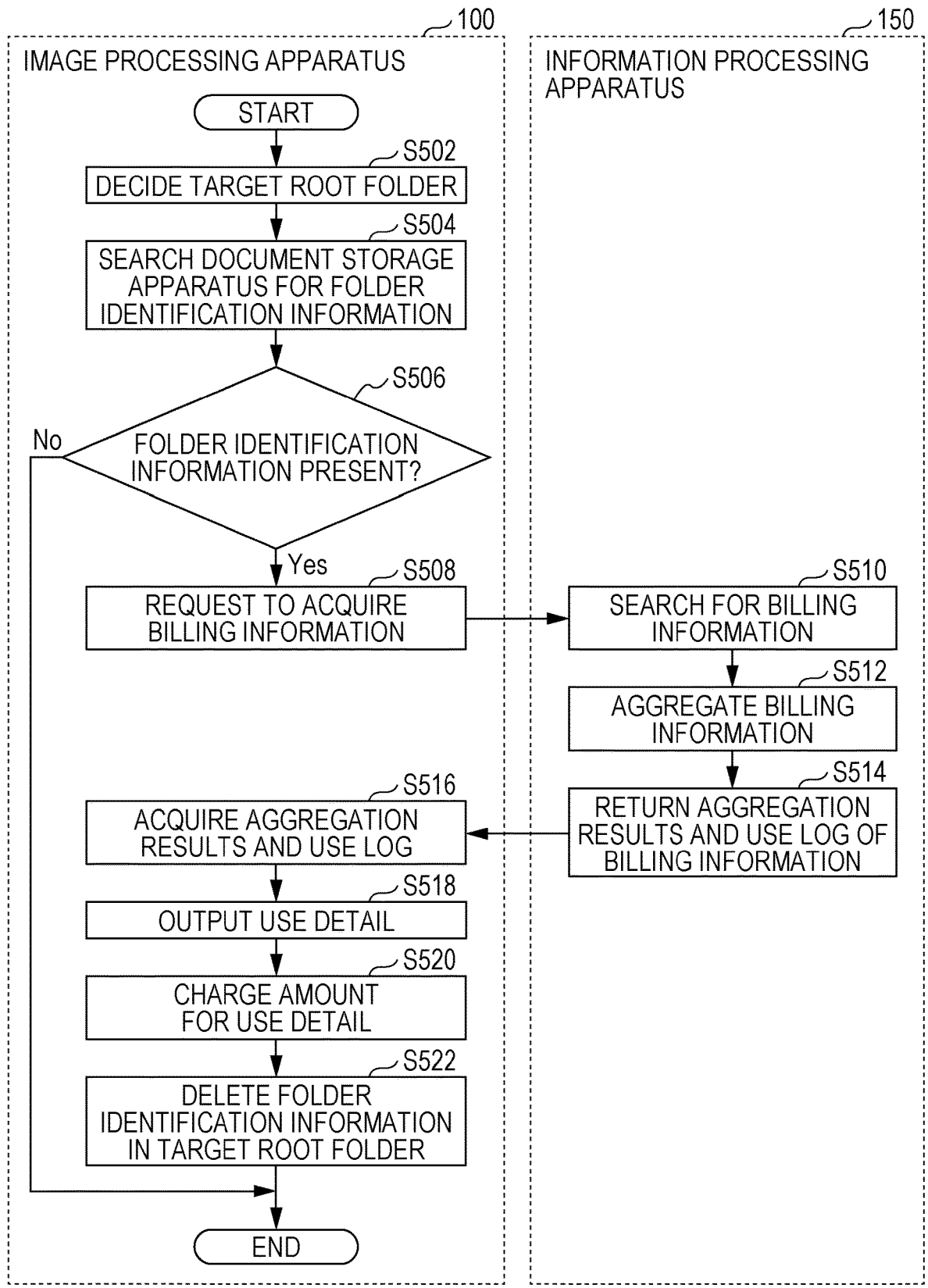
FIG. 5 is a flowchart illustrating a process of the exemplary embodiment.

FIG. 5 is a flowchart illustrating a process of the exemplary embodiment. The process is performed by the image processing apparatus 100 and the information processing apparatus 150.

When the use detail is used for an expense settlement process, the user 250 connects the document storage apparatus 200 used on the image processing apparatus 100 and specifies a folder and a time period serving as a target of the expense settlement process. The image processing apparatus 100 references the billing information on the information processing apparatus 150 and prints the detailed statement in the specified folder.

In step S502, the image processing apparatus 100 decides the root folder as a target in response to the operation of the user 250. The root folder indicates the billing destination which the user 250 has requested the billing information to be printed for. Folders present under the root folder may also be included.

In step S504, the image processing apparatus 100 searches the document storage apparatus 200 for the identification information of the folder. The image processing apparatus 100 may internally store a list of folders having the identification information of the folder.

In step S506, the image processing apparatus 100 determines whether the identification information of the folder is present. If the identification information of the folder is present, the image processing apparatus 100 proceeds to step S508 or otherwise ends the process.

In step S508, the image processing apparatus 100 requests the information processing apparatus 150 to acquire the billing information. The request to acquire the billing information may also include specifying the time period of the billing information.

In step S510, the information processing apparatus 150 searches for the billing information requested by the image processing apparatus 100.

In step S512, the information processing apparatus 150 aggregates the billing information on a per billing destination basis. A list of use logs may be generated from the billing information serving as the aggregation target. The use log may include the date and time of the printing, folder name, document name, and print information.

In step S514, the information processing apparatus 150 returns to the image processing apparatus 100 the aggregation results of the billing information and the use log.

In step S516, the image processing apparatus 100 acquires from the information processing apparatus 150 the aggregation results of the billing information and the use log. The image processing apparatus 100 may also display the aggregation results of the billing information and the use log.

In step S518, the image processing apparatus 100 prints the use detail in response to an operation of the user 250. The use detail as a print target may be the aggregation results of the billing information and the list of use logs. When the use detail is printed, billing information for printing the use detail may be added to the billing information.

In step S520, the image processing apparatus 100 charges the fee for printing the use detail.

In step S522, the image processing apparatus 100 deletes the identification information of the folder under the root folder as the target. When the identification information is deleted, the user 250 may be prompted to perform an operation indicating a permission to delete. The identification information may be deleted on condition that the user has made the operation indicating the permission to delete.

Figure 6:
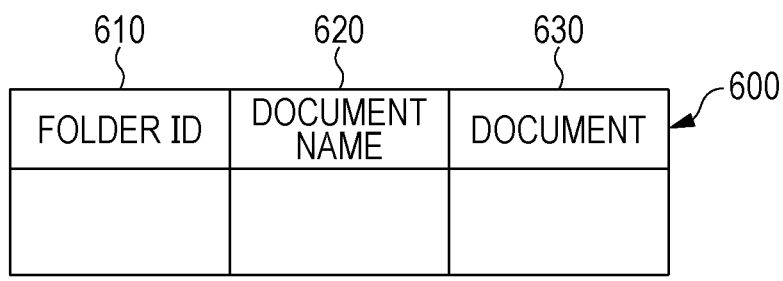
FIG. 6 illustrates a data structure of a print target document table.

FIG. 6 illustrates a data structure of a print target document table 600. The print target document table 600 is used to manage a correspondence between folders and documents in the document management module 345 in the document storage apparatus 200.

The print target document table 600 includes a folder identification (ID) column 610, document name column 620, and document column 630. The folder ID column 610 stores the identification information (for example, a folder ID) that uniquely identifies a folder in the exemplary embodiment. The document name column 620 stores a document name stored in the folder. The document column 630 stores the document.

FIGS. 7A1 through 7B2 illustrate screen examples of the exemplary embodiment displayed in the process in FIG. 4.

FIG. 7A1 illustrates a screen 700 displayed on a display of the image processing apparatus 100.

The screen 700 displays a title region 710a, folder and document display region 720, preview region 730, back button 735, and enter button 740.

A message reading "Printing for plain paper. Select one document and press enter button" is displayed in the title region 710a and an exit button 715 is displayed.

A folder 722, folder 724, and folder 726, each having a document stored as a print target therewithin, and document 728 serving as a print target are displayed in the folder and document display region 720.

A thumbnail image of the document selected by the user 250 in the folder and document display region 720 is displayed in the preview region 730. If the user 250 has selected the back button 735, the screen 700 reverts back to the immediately preceding screen. If the user 250 has selected the enter button 740, the image processing apparatus 100 advances to a screen in FIG. 7A2 to perform the print operation for the selected document.

In the display example in FIG. 7A2, the folder in FIG. 7A1 (specifically, one of the folders 722, 724, and 726) is selected and the document in the selected folder is displayed. The folder and document display region 720 displays documents 742 and 744.

FIGS. 7B1 and 7B2 illustrate screen examples obtained when the enter button 740 in FIG. 7A1 or FIG. 7A2 is selected.

The screen 700 displays a title region 710b, document name display region 745, print setting region 750, print count region 755, back button 760, print start button 765, and billing information display region 770.

A message reading "Printing for plain paper. Press start print button to start printing." is displayed on the title region 710b and the exit button 715 is also displayed.

The document name display region 745 displays "SampleFile.xxx" as a document as a print target.

The print setting region 750 displays "full color" as a color mode, "30 pages" as a specified page count of document, "A4" as sheet size, "no" for contracted, "no" as 2 pages in 1 page, "no" as duplicate, and "no" as binding.

The print count region 755 displays numerical keys for the user 250 to specify the print copies.

The billing information display region 770 displays "30 sheets" as total copies, "$15.00" as total amount, and "$15.00" as deficit.

When the print start button 765 is selected by the user 250, the print operation starts. When the print operation starts, the identification information of the folder is stored.

FIG. 7B2 illustrates the screen after the print operation is complete. The screen 700 includes a title region 710c, message display region 775, continue printing button 780, and take out medium button 785.

The title region 710c displays a message reading "Printing for plain paper. Printing complete. Verify content before pressing on-screen button".

For example, the message display region 775 displays "Printing: normally ended", "Print pages: 1 sheet (out of 1 sheet), fee: $0.10" "Take print out".

When the print operation is complete, the image processing apparatus 100 transmits the identification information of the folder and the billing information to the information processing apparatus 150.

The identification information of the folder is specifically described below. For example, the document name of the document with the identification information of the folder written therein is now "PrintChargeData.pcd". "pcd" is a unique extension in the exemplary embodiment and may be any extension as long as the extension is discriminated from those of other documents.

The content of the document indicates the identification information of the folder.

Only the user of the image processing apparatus 100 has the right to read or write the document.

The image processing apparatus 100 encrypts the document. Any encryption method is acceptable. Secret key cryptography or public key cryptography may be used.

The identification information of the folder is generated as described below.

The identification information of the folder is generated by base64 encoding a character string that is a combination of the print date and time and the image processing apparatus ID.

For example, a character string is generated by combining the date and time of use, the image processing apparatus ID (for example, MFP0000001), and the folder name (specifically, approximate quotation). For example, the combined character string may be "20181201123456MFP 0000001%-8aT %8eZ %8c % a9%90% cf". This character string is base64-encoded and the resulting identification information of the folder is "MjAxODEyMDExMjMONTZNRIAw MD AwMDAxJThhVCU4ZVoIOGMIYTkIOTAIY2Y="

FIG. 8 illustrates a data structure of a bill management table 800 as an example of the billing information. The bill management table 800 is generated by the image processing apparatus 100 and is then transmitted to the information processing apparatus 150.

The bill management table 800 includes a folder ID column 810, receipt data column 820, and use detail column 840. The receipt data column 820 includes date and time of print subcolumn 822, image processing apparatus ID subcolumn 824, document name subcolumn 826, page count subcolumn 828, fee per unit subcolumn 830, print count subcolumn 832, and fee sub column 834. The folder ID column 810 stores the identification information of the folder. The receipt data column 820 stores the billing information. The date and time of print subcolumn 822 stores the date and time of the printing (year, month, day, hours, minutes, seconds, and subseconds, or a combination thereof). The image processing apparatus ID subcolumn 824 stores information that uniquely identifies the image processing apparatus (specifically, the image processing apparatus ID) in the exemplary embodiment. The document name subcolumn 826 stores the document name of the printed document. The page count subcolumn 828 stores the page count of the printed pages. The fee per unit subcolumn 830 stores a fee per unit for the printing. The print count subcolumn 832 stores the copy count of the printed documents. The fee sub column 834 stores the fee for the printing. The use detail column 840 stores the use detail. For example, the use detail column 840 stores information indicating that the printed document has been discharged.

The folder ID: XXXXXXXXXX at the first row of the bill management table 800 indicates "2018/12/01 12:24:56" as the date and time of printing of the billing information, "MFP0000001" as the image processing apparatus ID, "AB proposal" as the document name, "5 pages" as the page count, "$0.10" as the fee per unit, "5 copies" as the print count, "$2.50" as the fee, and "discharged" as the use detail.

Figure 9A:
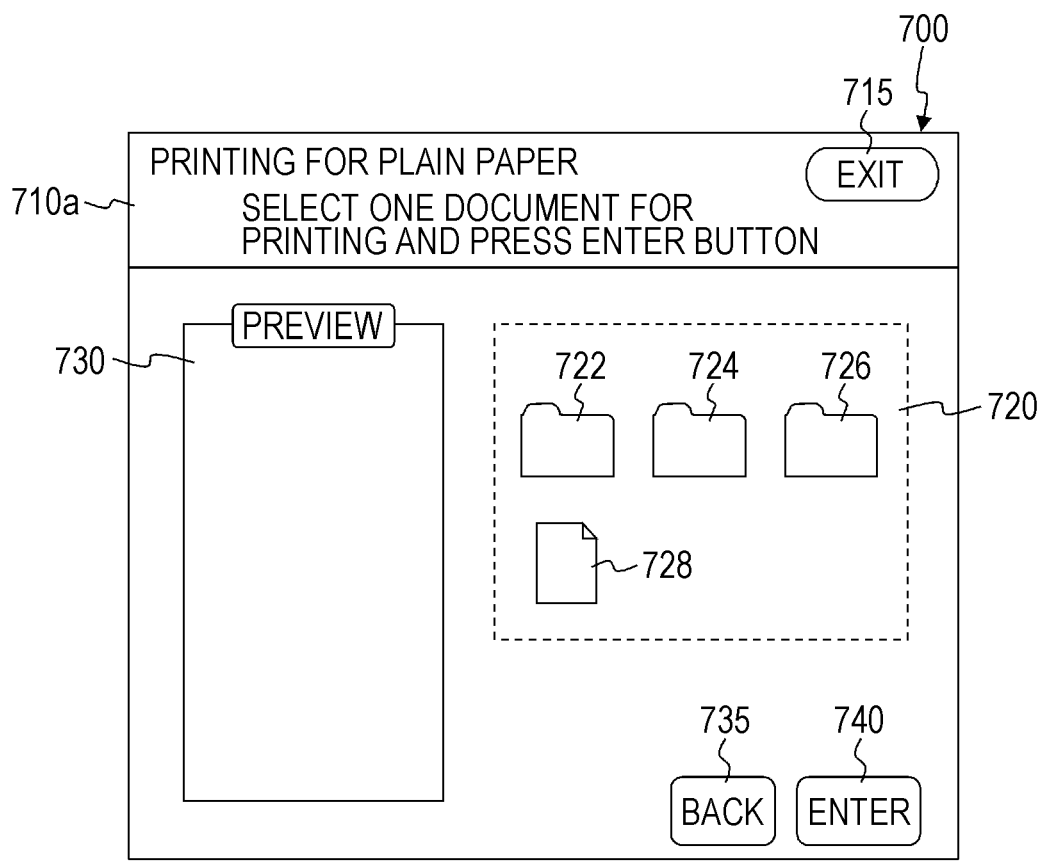
FIG. 9A illustrates a process example of the exemplary embodiment.

FIG. 9A through FIG. 9B2 illustrate screen examples displayed in the process in FIG. 5.

FIG. 9A illustrates the screen 700 identical to that in FIG. 7A1. The user 250 selects the root folder on the screen 700.

FIG. 9B1 illustrates the screen 700 where a print log is searched for after the root folder is selected.

The screen 700 displays a title region 710d, message region 905, aggregation period setting region 910, back button 915, and start printing button 920.

The title region 710d displays "Printing for plain paper" and the exit button 715.

The message region 905 displays "Searching for use log. Target folder: XXXXX".

The aggregation period setting region 910 displays the aggregation period that the user 250 is enabled to set.

If the back button 915 is selected by the user 250, the image processing apparatus 100 reverts back to the immediately preceding state. If the start printing button 920 is selected by the user 250, the image processing apparatus 100 searches for the billing information for the aggregation period set in the aggregation period setting region 910.

FIG. 9B2 illustrates the billing information aggregated when the start printing button 920 is selected in the example in FIG. 9B1.

The screen 700 includes a title region 710e, message region 925, back button 930, and start printing button 935.

The title region 710e displays a title reading "Printing for plain paper".

The message region 925 displays a message reading "Printing following use log. Total amount: $XXXXX.00 (Tax included) Aggregation period: yyyymmdd-yyyymmdd, use log (blank)".

If the back button 930 is selected by the user 250, the image processing apparatus 100 reverts back to the immediately preceding state. If the start printing button 935 is selected by the user 250, the aggregation results of the billing information are printed.

Figures 10, 11:
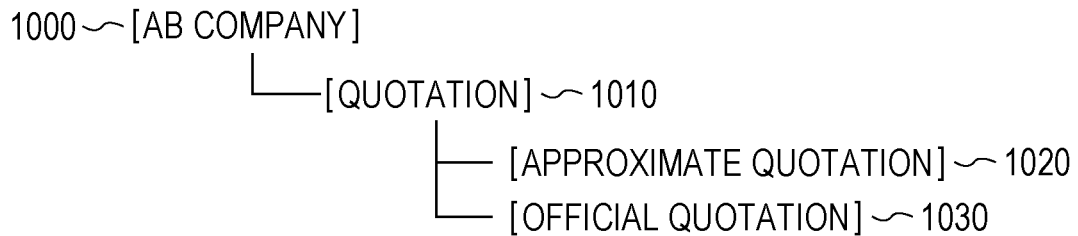
FIG. 10 illustrates a structure of a folder handled in accordance with the exemplary embodiment.
FIG. 11 illustrates a data structure of a folder and document management information table.

FIG. 10 illustrates a structure of a folder handled in accordance with the exemplary embodiment. Referring to FIG. 10, a quotation folder 1010 is present under an AB company folder 1000, an approximate quotation folder 1020 and an official quotation folder 1030 are present under the quotation folder 1010.

The user 250 may have a job related an AB company of creating quotations including an approximate quotation and an official quotation. The user 250 may print these data on the image processing apparatus 100. The folder structure in FIG. 10 is thus generated. If documents in the quotation folder 1010, the approximate quotation folder 1020, and the official quotation folder 1030 in the AB company folder 1000 as a root folder are printed, the billing information is aggregated. The quotation folder 1010, and the approximate quotation folder 1020 and the official quotation folder 1030 are folders at layers below the AB company folder 1000 and are examples of a second storage location with respect to the AB company folder 1000.

A folder and document management information table 1100 is used to manage documents in each folder and the identification information of each folder. FIG. 11 illustrates a data structure of the folder and document management information table 1100.

The folder and document management information table 1100 includes a folder name column 1110 and a storage document column 1120. The folder name column 1110 stores a folder name. The storage document column 1120 stores a storage document.

Two documents "AB pamphlet.pdf" and "AB proposal.pdf" are stored in the AB company folder and no document is stored in the quotation folder. A document "AB approximate quotation.pdf" is stored in the approximate quotation folder and a document "AB official quotation.pdf" is stored in the official quotation folder. "PrintCharge-Data.pdf" with the identification information of the folder written thereon is stored in the AB company folder 1000 and the approximate quotation folder 1020. Specifically, the folder and document management information table 1100 indicates the state after "AB pamphlet.pdf" or "AB pros-al.pdf" are printed and "AB approximate quotation" is printed. The image processing apparatus 100 having printed may not necessarily have to be the same image processing apparatus 100. More specifically, the image processing apparatus 100 having printed the AB pamphlet.pdf or the AB proposal.pdf may not necessarily have to be the image processing apparatus 100 having printed the AB approximate quotation.pdf. This is because PrintChargeData.pcd is generated each time the printing is performed.

FIG. 12 illustrates a process example of the exemplary embodiment. The aggregation results of the billing information have been printed. Specifically, a use detail 1200 is printed when the start printing button 935 in FIG. 9B2 is selected.

The use detail 1200 includes a received amount description column 1210 and a use log description column 1220.

For example, the received amount description column 1210 displays the detail as follows:

Amount received: $33.50 (tax included) Aggregation target: Receipt data satisfying following AND gate condition is aggregated.

(1) folder identification data present under root folder.

(2) Use detail is not yet output.

For example, the use log description column 1220 displays a message reading "Use log: Use log is listed as below" and displays a use log table 1230.

The use log table 1230 includes a print date and time column 1232, document name column 1234, page count column 1236, fee per unit column 1238, print count column 1240, and fee column 1242. The print date and time column 1232 lists the date and time of the printing. The document name column 1234 lists the document name of the printed document. The page count column 1236 lists the page count of the printed document. The fee per unit column 1238 lists the fee per unit for the printing. The print count column 1240 lists the print copies of the printed document. The fee column 1242 lists the fee for the printing.

The document having the print date and time "2018/12/05 12:34:56" at the first row of the use log table 1230 indicates "AB approximate quotation" as the document name, "1 page" as the page count, "$0.50" as the fee per unit, "2 copes" as the print copies, and "$1.00" as the fee. The document having the print date and time "2018/12/20 12:34:56" at the second row of the use log table 1230 indicates "AB pamphlet" as the document name, "2 pages" as the page count, "$0.50" as the fee per unit, "30 copes" as the print copies, and "$30.00" as the fee.

The identification information of a folder related to a folder having a document stored therein may be searched for. For example, the following process may be performed.

(1) When identification information is stored in a folder A having a document stored therein, the identification information of the folder A is also stored in a folder B related to the folder A. Specifically, the identification information is stored in multiple folders. For example, the folder B may be a folder in a layer immediately below or above the folder A. Conversely, when the identification information is stored in the folder B, the identification information of the folder B is also stored in the folder A related to the folder B. If the folder B is deleted or if the identification information of the folder B is deleted or modified, the identification information of the folder B still remains in the folder A.

(2) When the billing information is transmitted from the image processing apparatus 100 to the information processing apparatus 150, the identification information of the related folder B is also transmitted.

(3) When the billing information of the information processing apparatus 150 is managed, the identification information of a related folder is managed as supplemental information to the identification information of the folder.

(4) During aggregation of the billing information, the billing information in a specified root folder and the billing information in a related folder serve as aggregation targets.

(5) The user may select whether to output the aggregation results and the use log list of the billing information in the related folder to the use detail.

If the billing information in the folder B is unprinted when the billing information in the folder A is printed, an indication indicating that the billing information in the folder B remains unprinted may be displayed to the user. Conversely, if the billing information in the folder A is unprinted when the billing information in the folder B is printed, an indication indicating that the billing information in the folder A remains unprinted may be displayed to the user.

The information processing apparatus 150 may have a relay function between multiple image processing apparatuses 100 by managing the image processing apparatus ID and an IP address in association with each other. In this way, one image processing apparatus 100 many manage the billing information of another image processing apparatus 100.

(1) Each image processing apparatus 100 transmits the identification information of the folder to the information processing apparatus 150 during printing. The billing information is not transmitted.

(2) The information processing apparatus 150 manages in an associated form the identification information of the folder and the image processing apparatus ID, IP address, and date and time of use of the image processing apparatus 100.

(3) During the aggregation of the billing information, the information processing apparatus 150 checks the receipt data with the image processing apparatus 100 used during the target time period, collects the billing information from the image processing apparatus 100, and returns the collection results.

Figure 13:
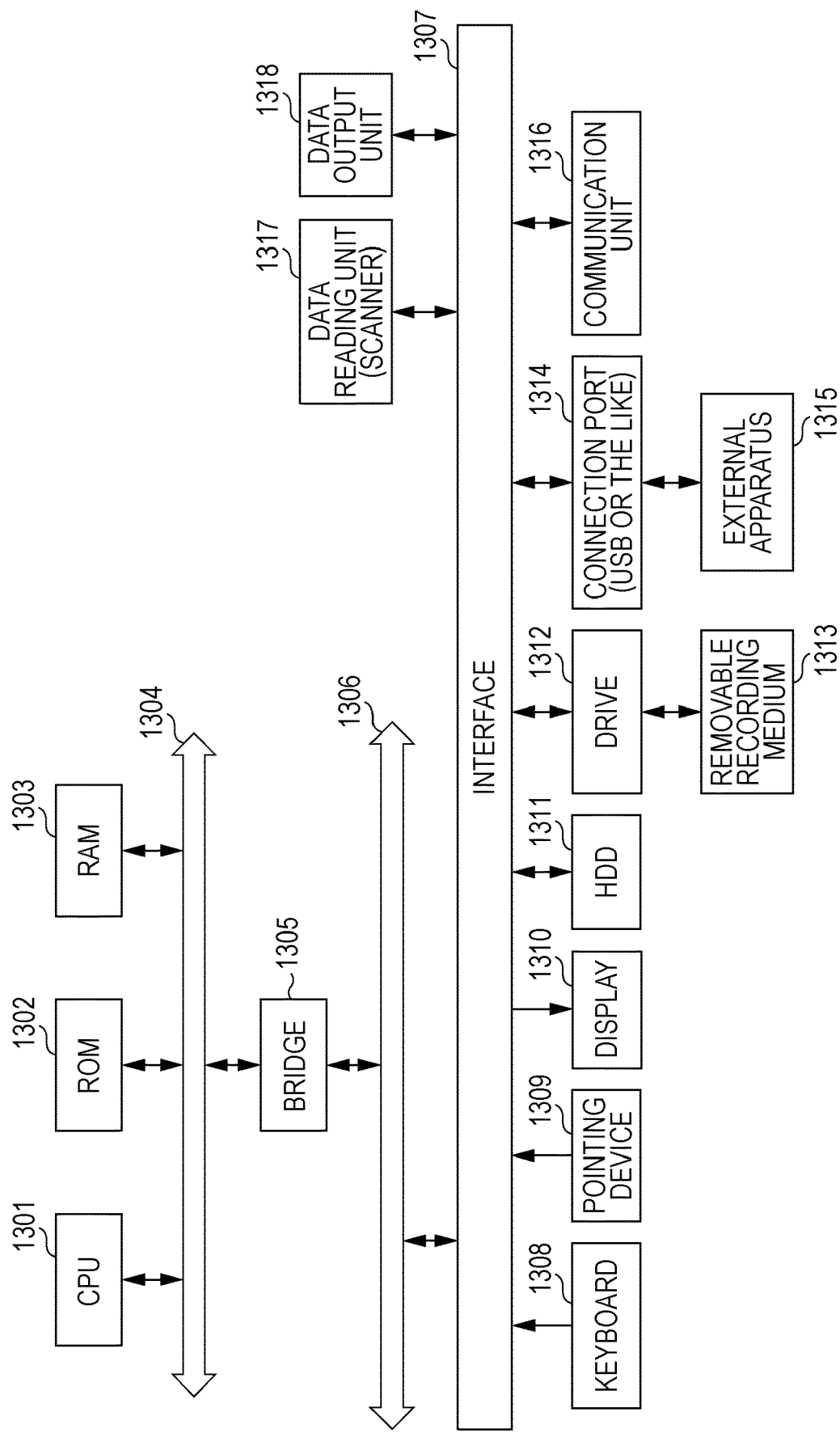
FIG. 13 is a flowchart illustrating a hardware configuration of a computer that implements the exemplary embodiment.

Referring to FIG. 13, the hardware configuration of the image processing apparatus 100 is described below. The hardware configuration illustrated in FIG. 13 may be implemented by a personal computer. The hardware configuration includes a data reading unit 1317, such as a scanner, and a data output unit 1318.

A central processing unit (CPU) 1301 is a controller that executes the computer program that describes the sequence of the above-described variety of modules. The modules include the communication module 105, transmission module 110, reception module 115, controller 120, user interface module 125, and printing module 130.

A read-only memory (ROM) 1302 stores a program and calculation parameters used by the CPU 1301. A random-access memory (RAM) 1303 stores the program used by the CPU 1301, and parameters that appropriately vary in the execution of the program. A host bus 1304 including a CPU bus interconnects these elements.

The host bus 1304 is connected via a bridge 1305 to an external bus 1306, such as a peripheral component interconnect/interface (PCI) bus.

A pointing device 1309, such as a keyboard 1308 or a mouse, is operated by the user. A display 1310 includes a liquid-crystal display device or a cathode ray tube (CRT) and displays a variety of information including image information and/or text information. A touch screen that performs the functions of both the pointing device 1309 and the display 1310 may be used. In such a case, the function of the keyboard 1308 may be implemented by drawing a software keyboard or a screen keyboard on a screen (such as a touch screen) without using the keyboard 1308 that is physically connected.

A hard disk drive (HDD) 1311 includes and drives a hard disk and records or reproduces information and the program executed by the CPU 1301. Alternatively, the HDD 1311 may include a solid state drive (SSD) that is a flash memory. The HDD 1311 stores operation data received by the user interface module 125, data received by the reception module 115, an image printed by the printing module 130, and resulting data of the process performed by the controller 120. The HDD 1311 further stores a variety of data and a variety of computer programs.

A drive 1312 reads data or a program stored on a removable recording medium 1313, such as a magnetic disk, optical disk, magneto-optical disk, or semiconductor memory. The device 1312 transfers the data and program to the RAM 1303 connected thereto via an interface 1307, external bus 1306, bridge 1305, and host bus 1304. The removable recording medium 1313 may be used as a data recording region.

A connection port 1314 connects to an external apparatus 1315 and includes a universal serial bus (USB) port and IEEE 1394 port. The connection port 1314 is connected to the CPU 1301 via the interface 1307, external bus 1306, bridge 1305, host bus 1304 and the like. A communication unit 1316 is connected to a communication network and performs a data communication process. The data reading unit 1317 may be a scanner and reads a document. The data output unit 1318 may be a printer and performs a document output process.

Figure 14:
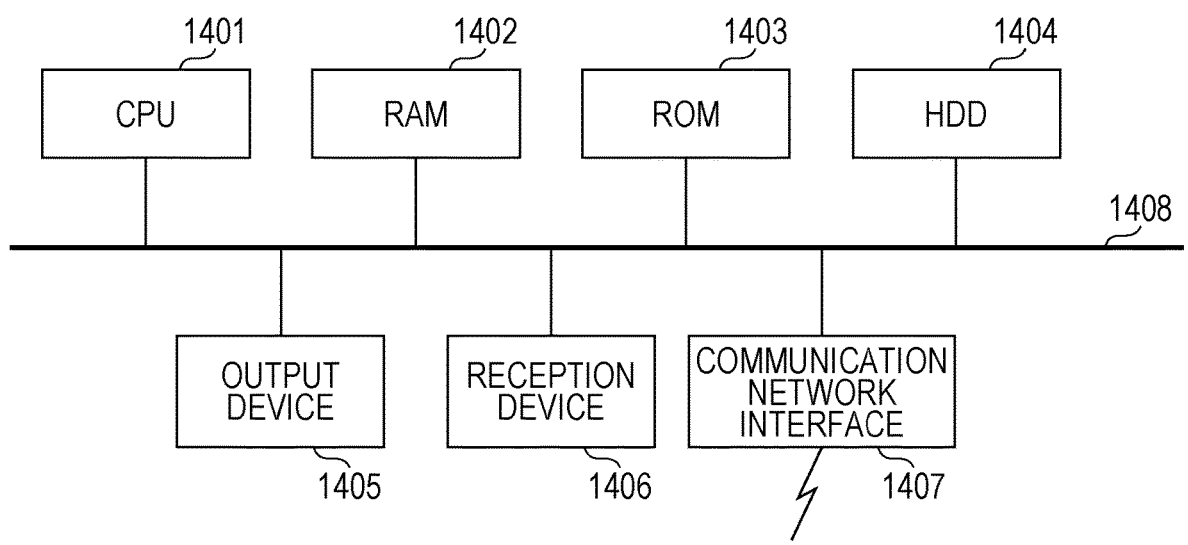
FIG. 14 is a block diagram illustrating a hardware configuration of a computer that implements the exemplary embodiment.

The hardware configuration of the information processing apparatus 150 that executes the program of the exemplary embodiment is a typical computer as illustrated in FIG. 14. Specifically, the information processing apparatus 150 is a personal computer or a computer that may function as a server. In other words, the computer includes a CPU 1401 as a processor, and an RAM 1402, ROM 1403, and HDD 1404 as memories. Specifically, the computer includes the CPU 1401, RAM 1402, ROM 1403, HDD 1404, reception device 1406, output device 1405, communication network interface 1407, and bus 1408. The CPU 1401 executes the programs corresponding to the communication module 155, reception module 160, transmission module 165, and bill processing module 170. The RAM 1402 stores the programs and data. The ROM 1403 stores the program that starts up the computer. The HDD 1404 is an auxiliary storage device that stores the date received by the transmission module 165 and process results provided by the bill processing module 170. The reception device 1406 receives data responsive to an operation (including a gesture, voice, and visual ling) of the user who operates a keyboard, mouse, touch screen, microphone, and/or camera (including a visual line detecting camera). The output device 1405 includes a cathode ray tube (CRT), a liquid-crystal display device, and/or a speaker. The communication network interface 1407 is used to connect to a network interface card. The bus 1408 is used to connect these elements. Multiple computers networked may be also be used.

The elements of the exemplary embodiment implemented by the computer program may be installed onto the system of the hardware configuration and software and hardware cooperate to implement the exemplary embodiment.

The hardware configuration in FIGS. 13 and 14 are illustrated for exemplary purposes only. The exemplary embodiment is not limited to the configurations in FIGS. 13 and 14. Any configuration may be acceptable as long as the configuration implements the modules described above in connection with the exemplary embodiment. For example, some modules may be implemented by using dedicated hardware (such as an application specific integrated circuit (ASIC)) or a reconfigurable integrated circuit (such as field-programmable gate array (FPGA)). In another example, some modules may be in an external system and connected to the system via a communication network. In yet another example, plural systems of FIG. 13 or FIG. 14 may be interconnected to each other via a communication network such that the systems operate in concert with each other. One of the modules may be incorporated not only in a personal computer, but also in a mobile information communication terminal (such as a mobile phone, smart phone, mobile device, or wearable computer), network home appliance, robot, copying machine, facsimile device, scanner, printer, or multi-function apparatus The above-described program may be supplied in a stored state on a recording medium. The program may also be provided via a communication medium. In such a case, the above-described program may be understood as the disclosure of a "non-transitory computer readable medium storing the program".

The "non-transitory computer readable medium storing the program" refers to a computer readable recording medium storing the program, and is used to install the program, to execute the program, or to distribute the program.

The recording media include digital versatile disk (DVD), compact disk (CD), Blu-ray disk (registered trademark), magneto-optical disk (MO), flexible disk (FD), magnetic tape, hard disk, read-only memory (ROM), electronically erasable and programmable read-only memory (EEPROM (registered trademark)), flash memory, random-access memory (RAM), and secure digital (SD) memory card. The DVDs include "DVD-R, DVD-RW, and DVD-RAM" complying with the standard formulated by the DVD forum, and "DVD+R and DVD+RW" complying with DVD+RW. The CDs include read-only CD (CD-ROM), recordable CD-R, and rewritable CD-RW.

The program in whole or in part may be stored on the recording medium for storage and distribution. The program in whole or in part may be transmitted via a transmission medium. The transmission media include a wired network, a wireless network, or a combination thereof. The wired and wireless networks may include a local-area network (LAN), metropolitan-area network (MAN), wide-area network (WAN), the Internet, intranet, and/or extranet. The program in whole or in part may be transmitted over a carrier wave.

The program may be part of another program, or may be stored on the recording medium together with another program. The program may be split and split programs may then be separately stored on the recording media. The program may be processed in any fashion before being stored as long as the program remains restorable. For example, the program may be compressed or encrypted before storage.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
an image processing apparatus;
an information processing apparatus,
wherein the image processing apparatus comprises a first processor programmed to perform control to:
print a document selected by a user; and
transmit to the information processing apparatus: (i) identification information that identifies a storage location at which the document is stored in a memory; and (ii) billing information related to printing the document, the storage location being one of a plurality of storage locations created for each of a plurality of billing destinations; and
store the identification information on the storage location to set the identification information to be undeletable or unmodifiable,
wherein the information processing apparatus comprises a second processor programed to perform control to:
receive from the image processing apparatus the identification information and the billing information; and
use the billing information to perform, for each billing destination corresponding to the storage location identified by the identification information, a billing process related to the printing of the document, and
wherein the billing information regarding each of a plurality of printed documents is sorted into respective storage locations of each of the plurality of storage locations identified by the identification information, according to the respective billing destinations, without the user expressly specifying the billing destination corresponding to the printed document.

2. An image processing apparatus comprising:
a processor programmed to perform control to:
print a document selected by a user;
transmit to an information processing apparatus: (i) identification information that identifies a storage location at which the document is stored in a memory; and (ii) billing information related to printing the document, the storage location being one of a plurality of storage locations created for each of a plurality of billing destinations,
wherein the billing information regarding each of a plurality of printed documents is sorted into respective storage locations of each of the plurality of storage locations identified by the identification information, according to the respective billing destinations without the user expressly specifying the billing destination corresponding to the printed document; and
store the identification information on the storage location to set the identification information to be undeletable or unmodifiable.

3. The image processing apparatus according to claim 2, wherein the processor is programmed to perform control to set the identification information to be deletable or modifiable on condition that an operation on the image processing apparatus is an operation of the user.

4. An image processing apparatus comprising:
a processor programmed to perform control to:
print a document selected by a user;
transmit to an information processing apparatus: (i) identification information that identifies a storage location at which the document is stored in a memory; and (ii) billing information related to printing the document, the storage location being one of a plurality of storage locations created for each of a plurality of billing destinations,
wherein the billing information regarding each of a plurality of printed documents is sorted into respective storage locations of each of the plurality of storage locations identified by the identification information, according to the respective billing destinations without the user expressly specifying the billing destination corresponding to the printed document; and
set the identification information to be deletable or modifiable and to store, on the storage location, identification information that is intended to be stored on a second storage location related to the storage location.

5. The image processing apparatus according to claim 4, wherein the processor is programmed to perform control to:
receive the billing information which has undergone a billing process of the information processing apparatus,
wherein when the billing information is printed, the transmitting unit transmits to the information processing apparatus the identification information stored on the storage location,
wherein the printing unit prints the billing information received from the information processing apparatus, and
wherein when the billing information is printed, the controller indicates to the user an indication that billing information related to the second storage location has not been printed if the billing information related to the second storage location has not been printed.

6. The image processing apparatus according to claim 4, wherein the processor is programmed to perform control to:
receive billing information which has undergone a billing process of the information processing apparatus,
wherein when the billing information is printed, the transmitting unit transmits to the information processing apparatus the identification information stored on the storage location,
wherein the printing unit prints the billing information received from the information processing apparatus, and
wherein if the second storage location has been deleted or the identification information on the second storage location has been deleted or modified when the billing information is printed, the controller sets billing information related to the second storage location to be printable by using the identification information on the second storage location in the storage location.

7. A non-transitory computer readable medium storing a program causing a computer to execute a process for processing an image, the process comprising:
printing a document selected by a user;
transmitting to an information processing apparatus: (i) identification information that identifies a storage location at which the document is stored in a memory; and (ii) billing information related to printing the document, the storage location being one of a plurality of storage locations created for each of a plurality of billing designations,
wherein the billing information regarding each of a plurality of printed documents is sorted into respective storage locations of each of the plurality of storage locations identified by the identification information, according to the respective billing destinations without the user expressly specifying the billing destination corresponding to the printed document; and storing the identification information on the storage location to set the identification information to be undeletable or unmodifiable.

\* \* \* \* \*